UNITED STATES PATENT OFFICE.

GEORGE GARDINER, OF EAST CLEVELAND, OHIO.

SOLDERING COMPOUND.

1,239,785. Specification of Letters Patent. Patented Sept. 11, 1917.

No Drawing. Application filed May 1, 1916. Serial No. 94,781.

*To all whom it may concern:*

Be it known that I, GEORGE GARDINER, a subject of Great Britain, residing at East Cleveland, in the county of Cuyahoga and State of Ohio, have invented certain new and useful Improvements in Soldering Compounds, of which the following is a specification.

This invention relates to soldering compounds, and has for its object to provide a compound particularly adapted and intended for soldering aluminum, although it is capable of use for soldering other metals, or for soldering aluminum to other metals.

In making the compound, for example, one pound of zinc is placed in a metal ladle and heated, and to this is added two ounces of spermaceti, and when the zinc becomes molten impurities will rise to the surface in the form of a scum which is removed. Then two pounds of tin are added, and this is permitted to melt in the ladle, and after it becomes molten a scum rises which is removed. Then eight ounces of pure Babbitt metal—composed of tin, zinc, copper and antimony in the following proportions by weight: tin, 37.4375 parts, zinc 18.435 parts, copper .125 part and antimony .0025 parts,—are added and melted, and the mixture is stirred vigorously and finally poured into an iron or stone mold to cool and harden, and it is then ready for use.

In the use of the compound, the parts to be soldered are scraped and cleaned, and the compound may then be used in the same manner as an ordinary soldering bar, with the aid of a hot soldering iron, the result being to firmly unite the parts.

The spermaceti is particularly desirable to purify the materials, this addition to the melted ingredients of the mixture causes the impurities to rise as a scum which can be removed, thereby preventing unsatisfactory results which would otherwise be produced.

The proportions specified are such as have been found best, or desirable, but these proportions may be varied within the scope of the invention.

What I claim as new is:

A soldering compound consisting of tin, zinc, copper and antimony in substantially the proportions of tin 35 ounces, zinc 17½ ounces, copper 1 ounce and antimony 1/50 ounce.

In testimony whereof, I do affix my signature in presence of two witnesses.

GEORGE GARDINER.

Witnesses:
 JOHN A. BOMMHARDT,
 G. W. ROSENBERG.

Copies of this patent may be obtained for five cents each, by addressing the "Commissioner of Patents, Washington, D. C."